United States Patent [19]

Dille et al.

[11] 4,386,132

[45] May 31, 1983

[54] FLY FISHING LINE

[75] Inventors: William A. Dille, Maplewood; Wayne E. Erickson, Saint Paul; Leon D. Royer, White Bear Lake, all of Minn.

[73] Assignee: Minnesota Mining and Manufacturing Company, Saint Paul, Minn.

[21] Appl. No.: 303,551

[22] Filed: Sep. 18, 1981

Related U.S. Application Data

[63] Continuation of Ser. No. 134,527, Mar. 27, 1980, abandoned.

[51] Int. Cl.$^3$ .............................................. D02G 3/00
[52] U.S. Cl. .................................. 428/372; 43/44.98; 428/375; 428/394; 428/395; 428/398
[58] Field of Search .............. 428/375, 372, 394, 395, 428/421, 422, 398; 43/44.98

[56] References Cited

U.S. PATENT DOCUMENTS

| | | | |
|---|---|---|---|
| 3,043,045 | 7/1962 | Martuch | 43/44.98 |
| 3,523,034 | 8/1970 | Howard | 43/44.98 X |
| 3,748,168 | 7/1973 | Schmidt et al. | 43/44.98 X |
| 3,950,298 | 4/1976 | McCown et al. | 526/323.2 X |

*Primary Examiner*—Lorraine T. Kendell
*Attorney, Agent, or Firm*—Cruzan Alexander; Donald M. Sell; Gerald F. Chernivec

[57] ABSTRACT

A floating fly fishing line comprising a core member and having a substantially smooth plastic surface coating, the coating containing therein a fluorinated polymer, the polymer being capable of imparting to said plastic coating, when contained therein at a concentration of about 0.25 percent by weight, a contact angle with water in air of greater than about 60°, a contact angle with gasoline in air of greater than about 30°, and a contact angle with mineral oil in air of greater than about 15°.

5 Claims, No Drawings

FLY FISHING LINE

This is a continuation of application Ser. No. 134,527, filed Mar. 27, 1980, now abandoned.

BACKGROUND OF THE INVENTION

This invention relates to fishing lines, and more particularly to a buoyant fishing line particularly adapted for use in fly fishing.

In fly fishing, a small substantially weightless hooked lure, which resembles a fly or other insect, is cast upon the water. Normally, the fly or artifical lure is attached to a monofilament "leader" which is virtually transparent in the water and which sinks just below the surface of the water, while the fly or artifical lure remains on the water surface or just below same. Attached to this "leader" is the line, which is typically cast with the particular types of weight rods used for fly fishing.

In casting the fly or artifical lure, since both are extremely light, substantially all the propelling force and momentum for the lure must necessarily come from the line itself. However, the use of a "heavy" line is prohibited since the line must be capable of floating on the surface of the water in order that the lure or fly will similarly float thereon. Therefore, the line cannot have a specific gravity of above approximately 1.15 or the surface tension of the water will not be sufficient to keep the line afloat.

A fly fishing line of high quality should be stiff enough to throw its own weight in a substantially straight line from the end of the fly rod to the target when casting; it must be sufficiently flexible to afford good "throwing" and "laying" characteristics; it should float; it should be sufficiently hard-surfaced such that it will "shoot" well, i.e., easily pass through the guides of the fly rod; it should have a sufficiently tough surface that it may not become cracked and broken during use; it should have sufficiently high tensile strength and stretch without permanent elongation; it should be resistant to temperature changes, i.e., be stable at 0° C. and 50° C. without becoming brittle or sticky; it should have a life-long floating characteristic not requiring frequent dressing, if any; it should be water-repellent such that it need not be dried after use; it should be resilient after being creased or sharply bent, i.e., not subject to "elbowing"; and the tip portion thereof should be small so as to be less visible to the fish.

Prior art fly fishing lines have been disclosed which attempt to meet the foregoing criteria. One such disclosure is U.S. Pat. No. 3,043,045, where there is disclosed a fly line including a core member of substantially uniform diameter made of, for example, a braided nylon filament, an adhesive priming coating over the core, and a tapered plastisol coating of, for example, polyvinyl chloride having embedded therein a controlled quantity of preformed bubbles of microscopic size, such as hollow microspheroids or microballoons which impart a controlled degree of buoyancy to the line.

U.S. Pat. No. 3,830,009 and United Kingdom Pat. No. 1,369,256 disclose the use of an inert gas incorporated into the fly line during the extrusion thereof to form a somewhat foamed internal core. U.S. Pat. Nos. 3,849,929 and 3,936,335 disclose a foamed core surrounded by a filamentous line to provide improved buoyancy to the fly line. U.S. Pat. No. 3,914,480 discloses an improved plastisol coating for the surface of fly lines to impart desired characteristics thereto.

It has now been found that by compounding a hereinafter defined fluorochemical into an only preferred composition useful as the fly line plastic surface coating, the fly line has better castability, better shootability, better floatability, and can be picked up easier, because water will not wet same as readily as prior art fly lines.

SUMMARY OF THE INVENTION

In accordance with the invention, there is provided a floating fly fishing line comprising a core and a substantially smooth plastic surface coating, said coating containing therein fluorinated polymer, said polymer being capable of imparting to said plastic coating, when contained therein at about 0.25 percent by weight a contact angle with water in air of greater than about 60°, a contact angle with gasoline in air of greater than about 30°, and a contact angle with mineral oil in air of greater than about 15°.

The inclusion of the fluorinated polymer in the fly line of my invention provides greater solvent resistance to the line, e.g., to solvents commonly encountered during fishing, such as gasoline, and to organic compositions such as insect repellents.

DETAILED DESCRIPTION OF THE INVENTION

The invention includes a fly fishing line having a core member, such as those disclosed in the aforementioned patents, which is preferably made of nylon or silk filaments braided so as to form a cylinder having a substantially uniform diameter throughout its length. In the alternative, other cylindrical, stretchable base cores may be utilized, provided that the density of same is not sufficiently high to cause the finished coated line to sink in water.

The base core can be treated with a uniform priming coatng of an adhesive material to permit satisfactory bonding of a subsequently applied plastic coating. One adhesive coating suitable for use herein is a soluble synthetic rubber of the acrylonitrile-butadiene copolymer dissolved in a suitable organic solvent, such as methylethylketone or methylisobutylketone. Such adhesives, typically for bonding nylon with other polymers, are known and are obtainable commercially.

Other intermediate coatings can be applied as desired, such as for example are disclosed in U.S. Pat. No. 3,830,009 and United Kingdom Pat. No. 1,369,256.

Superimposed upon the priming, adhesive, or other intermediate coating, if used, or directly upon the core, is a plastic coating which comprises essentially a plastic coating composition containing a fluorinated polymer. The plastic composition must be sufficiently viscous to form a relatively thick covering or coating over the core or primer coating.

One such composition, which is a plastisol, is comprised of a dispersion of finely divided polyvinyl chloride in one or more plasticizers, as is taught in U.S. Pat. No. 3,043,045. A polyvinyl chloride which will form a plastisol has a very small particle size, on the order of one micron thereby allowing it to disperse in a plasticizer, but not to dissolve therein until heated to temperatures used for fusing, e.g., about 180° C. One polyvinyl chloride which has been proved particularly satisfactory is sold under the trade designation "Geon Paste Resin 121", manufactured by the B. F. Goodrich Chemical Company, and described in U.S. Pat. No. 2,188,396. However, any polyvinyl chloride having a small particle size, such as that sold under the trade designation "VYNV 3" by the Bakelite Division of Union Carbide Corp. or under the trade designation "VR" by the Marvinol Company, has been found suitable.

In addition, other plastisols, such as are disclosed in U.S. Pat. No. 3,914,480, are applicable for use in our invention. Similarly, extrudable plastic compositions as disclosed in U.S. Pat. No. 3,830,009 are equally applicable for use in our invention.

Using the aforementioned polyvinyl chloride, a plasticizer or mixture of same must be utilized in conjunction therewith to produce an organosol or plastisol. Such compositions are typically prepared having a consistency at least sufficient to maintain the desired coating diameter about the core after application and sizing with a doctoring blade or other sizing device. The viscosity of this composition may be greater than is ordinarily employed for plastisols in the coating field. This increased viscosity can be obtained by dissolving in the plasticizer a vinyl chloride-vinyl acetate polymer containing from 10 to 15 percent vinyl acetate. However, any polymer which is soluble in the plasticizers will increase its viscosity, thereby permitting the use of numerous equivalents for the purpose of increasing the viscosity of the composition. The plasticizer may be any of the conventional plasticizers, such as dioctyl adipate, -sebacate, -phthalate, or trioctyl phosphate.

A preferred system for the floating fly line construction herein includes the hollow microspheroids or microballoons as are taught in U.S. Pat. No. 3,043,045. The microspheroids or microballoons preferably have an average diameter of from about 2 to about 60 microns. Increasing sizes tend to provide roughness to the coating, are more fragile, and make coating more difficult. Smaller sizes can adversely affect the density of the floating fly line.

The microballoons are preferably of the glass bubble type, a commercial example of which are available from the 3M Company under the designation B-22A. However, microballoons made of other material may also be used, such as the phenolic microballoons made by the Bakelite Division, Union Carbide Corp. These microballoons may be filled with air, nitrogen, helium, or with other non-condensable gases.

Furthermore, the foamed structures or foamed cores and the multiple coating structures as disclosed in the patents hereinbefore discussed are equally applicable for use in our invention.

Regardless of the specific plastic coating formulation or floating fly line manufacture (e.g., microballoons, foamed core, inert gas-containing composition, etc.), it has been found that the inclusion therein of a fluorinated polymer provides improved performance of the fly line relative to the previously mentioned characteristics. In addition, the fly line is more impervious to solvents, such as gasoline, or oils, which may typically be found in fishing boats, for example. Furthermore, the fly lines are more impervious to organic materials such as insect repellents.

When using microballoons, same are thoroughly mixed with the plastisol composition before application to the line to insure that the microballoons are uniformly distributed throughout the mass of the plastisol. The proportion of microballoons to the plastisol mixture varies depending upon the specific gravity desired for the line subsequent to the coating operation. However, in a typical example, to obtain a line having a specific gravity of 0.95, seven pounds of microballoons per 100 pounds of plastisol having an initial density of 1.3 are utilized.

It has been found that a simple test can be utilized to determine fluorinated polymers which are effective in the floating fly line of our invention. In essence, the fluorinated polymer is added to the plastic coating composition at a concentration of about 0.25 percent by weight, following which the contact angle thereof in water, gasoline, and mineral oil is measured. If the contact angle of the plastic coating material is greater than about 60° with water in air, greater than about 30° with gasoline in air, and greater than about 15° with mineral oil in air, the fluorinated polymer has utility in the floating fly line of the invention.

With a plastisol composition, contact angles can be obtained by utilizing a surface coated with the plastisol composition followed by fusing. In order to obtain a smooth, reproducible surface, such tests are best performed on a sample film which has been deposited on a smooth substrate. By way of example, a piece of two mil polyester film can be coated with the plastisol utilizing a conventional flat bed notched-bar coater with an orifice setting of 15 mils. The plastisol coating is then fused by heating in an oven for 5 minutes at 180° C. After cooling, the coated fused film thickness of approximately 10 mils can be attached to the surface of a glass microscope slide by a convenient means, e.g., two side-coated transparent tape.

When utilizing a plastic coating capable of being extruded, the plastic composition containing the fluorinated polymer can be simply extruded in film form using conventional techniques.

Throughout the treating and sample preparation, care must be taken to avoid contamination of the sample surface with fingerprints, dust, and the like.

Contact angles are measured directly using suitable optical systems on samples maintained in a covered container in an atmosphere saturated with vapor at a temperature constant at 23° plus or minus 1° C. Drops are applied by a syringe inserted through the cover to a slide supported in the container.

For measurement of gasoline and mineral oil contact angles in air, samples and equipment are allowed to equilibrate at 23° C. for 15 minutes. Three or four separate drops are then placed on the sample surface and the contact angle measured repeatedly for each drop until consistent readings are obtained. The maximum angle observed corresponds to the contact angle, since irregularities in the surface will always cause a low apparent angle. For measurement of contact angles of water in air, the values may decrease with time as the surface may tend to become hydrated. The reading must, therefore, be taken within no more than 5 seconds, and preferably within 2 seconds, after drop placement, if a decreasing value with time is observed. This can be achieved by approximating the angles on a series of water drops, then rapidly observing the angles of fresh droplets.

It has been determined that a preferred concentration of from about 0.125 to about 4.0 percent by weight of a fluorinated polymer provides the beneficial results hereinbefore referenced to the plastic coating composition. At less than about 0.125 percent by weight, the benefit achieved by the addition of the fluorinated polymer may tend to be minimal. At concentrations greater than about 4.0 percent by weight, the contact angle benefit provided is not increased appreciably, and the fly line may be adversely affected, as evidenced by a tacky or sticky feeling to the touch.

In addition to the foregoing, the fluorinated polymer must be compatible with the plastic composition chosen, and must be soluble in plasticizers, if any, used therein. In the case of the aforementioned polyvinyl chloride-based plastisol, for example, the fluorinated polymers must be compatible with the plasticized polymer therein, and therefore must be reasonably polar in nature.

The fluorinated polymer may be a condensation polymer, e.g., a polyester or polyurethane, or a vinyl polymer such as an acrylate or methacrylate, or mixtures of polymers.

Preferred fluorinated polymers include those derived from fluoroaliphatic radical-containing vinyl monomers, such as acrylates or methacrylates. Generally, such monomers are termed fluoroaliphatic vinyl monomers, or fluoroaliphatic acrylates or methacrylates. It is essential that the monomer contain a fluoroaliphatic radical terminating in at least one $CF_3$ group. The fluoroaliphatic radical should contain at least three fully fluorinated carbon atoms which may or may not contain the terminal $CF_3$. A perfluoroalkyl group, $C_nF_{2n+1}$, is preferred where n is 3 to 20. The monomer should contain at least 25 percent by weight of fluorine in the form of fluoroaliphatic radicals and preferably at least 30 percent and up to as much as 60 percent, generally about 50 percent.

The fluoroaliphatic radical discussed above is a fluorinated, saturated, monovalent, non-aromatic, aliphatic radical of at least three carbon atoms. The chain may be straight, branched, or if sufficiently large, cyclic, and may be interrupted by divalent oxygen atoms or trivalent nitrogen atoms bonded only to carbon atoms. Preferably, the chain of the fluoroaliphatic radical does not contain more than one nitrogen or oxygen atom for every two carbon atoms in the skeletal chain. A fully fluorinated group devoid of hydrogen atoms is preferred, but hydrogen or chlorine atoms may be present as substitutents in the fluorinated aliphatic radical provided that not more than one atom of either is present in the radical for every two carbon atoms, and that the radical must at least contain a terminal perfluoromethyl group. "Terminal" in this context refers to the position in the skeletal chain of the radical which is furthest removed from the backbone chain of the segment. Preferably, the fluoroaliphatic radical contains not more than 20 carbon atoms because such a large radical results in inefficient use of the fluorine content.

The second component needed for the preferred fluorinated polymer is a polyoxypropylene or preferably polyoxytetramethylene acrylate or methacrylate. When preparing the preferred acrylate or methacrylate, the corresponding polyoxytetramethylene diol average molecular weight can vary from about 750 to about 4,000, but is preferably about 1,500 to about 2,500. The material available commercially as Polymeg 2,000 (tradename for a product available from the Quaker Oats Company) is suitable. Esterification of from 50 to 90 percent, and preferably about 50 percent, with acrylic or methacrylic acid by essentially conventional procedures provides a useful acrylate component. Preparation of such a component is taught in the prior art, such as, for example, in U.S. Pat. No. 3,950,298.

Optionally, a third component in the preferred fluorinated polymer is a fluorine-free functionality, such as any conventional monomer capable of copolymerizing with the two above-mentioned monomers, such as acrylates or methacrylates.

In the most preferred case, the fluorinated polymer contains from about 25 to about 40 percent by weight of carbon-bonded fluorine in the form of the aforementioned fluoroaliphatic radical; from about 15 to about 30 percent polytetramethylene oxide; and up to about 15 percent of the aforementioned fluorine-free monomer.

An exemplary manufacture of a floating fishing line of our invention would involve first coating a braided line of nylon or other material having a substantially uniform diameter with an adhesion primer coating, as previously described, to provide a suitable bond for the ultimate plastisol coating. The adhesive-coated core is then passed through a coating tank containing a polyvinyl chloride/fluorinated polymer plastisol mixture. This mixture could also include microballoons uniformly distributed throughout the mass thereof. The coated line would then be passed in contact with a sizing device to obtain the proper coating thickness.

In the production of a fly fishing line, a variable orifice sizing device is preferably uses so as to provide a coating of tapering diameter on the line. The thickness or outer diameter of the coating is gradually reduced as the tip portion of the line is approached. The tapered line thus produced has a relatively light tip portion which is less visible to fish, and a somewhat heavier main body portion. When such a tapered line is cast from the fishing rod, the heavier main body of the line causes propelling of the lighter or tapered tip portion. This, in turn, causes propelling of the still lighter leader and lure.

After being sized as desired, the coated line would then be passed through a heating zone where the temperature of the coating is caused to reach the fusing temperature of about 175° to 200° C., at which temperature the plasticizer will solvate the polyvinyl chloride particles and the plastisol will become fused. The fusing of the coating may be accomplished by radiant heating means, although other techniques which do not cause scorching of the coating are satisfactory. The heating of the plastisol coating at the fusing temperature causes a hardening or setting of the coating about the core without change of dimension, and provides a relatively smooth outer surface.

In the case of a foamed fly line, as disclosed, for example, in U.S. Pat. No. 3,830,009, the fluorinated polymer can be simply added to the base resin prior to the extrusion step.

The following example is submitted to more clearly illustrate the present invention, without limiting same. Unless otherwise indicated, parts as enumerated are by weight.

EXAMPLE 1

A first premix was made by mixing 144 parts of dioctyl phthalate, an ester type plasticizer, and 24 parts of a copolymer of vinyl chloride containing 13 percent vinyl acetate, followed by heating to dissolve the copolymer and cooling to room temperature.

A second premix was made by mixing 20 parts of a fluorinated polymer in 80 parts dioctyl phthalate, heating the mixture to 250° C., mixing until homogeneous, and cooling to room temperature. The fluorinated polymer contained about 35 percent by weight of carbon-bonded fluorine in the form of fluoroaliphatic radical, about 17 percent by weight of polytetramethylene oxide, and about 9 percent by weight of a fluorine-free acrylate. The complete plastisol formulation was prepared by combining 168 parts of the first premix, 70 parts of the second premix, 70 parts of dioctyl sebacate, 80 parts of dioctyl adipate, 10 parts of trioctyl phosphate, 15 parts of chlorinated paraffin, 10 parts of mineral oil, 9 parts of a metal complex conventionally used to stabilize polyvinyl chloride against degradation, and 550 parts of a dispersion grade polyvinyl chloride having a particle size of approximately 1 micron (GEON Paste Resin 121, commercially available from B. F. Goodrich).

Seven parts of glass microballoons were then added per 100 parts of the plastisol formulation, followed by mixing until uniform in a Dough Type Mixer, available from Hobart. (Alternatively, a conventional paint mill could be used.)

Thereafter, a graded nylon core was passed through an adhesive composition comprising an acrylonitrile-butadiene copolymer in methylethylketone solvent to form a thin layer of adhesive on the core.

After heating at about 100° C. for about 2 minutes, the adhesive-coated core was passed through the plastisol and microballoon coating mixture previously described. The plastisol adhered to the core such that it was necessary to employ a doctoring device to finally size the coating. After sizing, the coating was cured by heating for about 45 seconds by a radiant heating deivce which produced temperatures within the coating of about 180° to 200° C.

The contact angles of the fly line were determined to be 75° with water in air, 40° with gasoline in air, and 55° with mineral oil in air. When the example was repeated with the fluorinated polymer eliminated from the formulation, the contact angles were found to be 60° with water in air, 15° with gasoline in air, and 20° with mineral oil in air.

What is claimed is:

1. A floating fly fishing line comprising a core and having a substantially smooth plastic surface coating, said coating comprising plasticized polyvinyl chloride and at least one fluorinated polymer, said fluorinated polymer being derived from a fluoroaliphatic radical-containing vinyl monomer and a polyoxytetramethylene acrylate or methacrylate, and being capable of imparting to said plastic coating, when contained therein at about 0.25 percent by weight, a contact angle with water in air of greater than about 60°, a contact angle with gasoline in air of greater than about 30°, and a contact angle with mineral oil in air of greater than about 15°.

2. The fly fishing line of claim 1 wherein said fluorinated polymer comprises from about 0.125 to about 4.0 percent by weight of said plastic coating.

3. A fly fishing line as defined in claim 1 wherein said plastic surface coating contains a multiplicity of hollow pre-formed microspheroids substantially uniformly distributed throughout the length and thickness thereof, said microspheroids having a diameter range of from about 2 to about 60 microns.

4. The fly fishing line of claim 1 wherein an additional component utilized to derive said fluorinated polymer is a fluorine-free monomer capable of copolymerizing with said fluoroaliphatic radical-containing vinyl monomer and said polyoxytetramethylene acrylate or methacrylate.

5. The fly fishing line of claim 1 wherein said fluorinated polymer contains from about 25 to about 40 percent by weight of carbon-bonded fluorine in the form of a fluoroaliphatic radical; from about 15 to about 30 percent polytetramethylene oxide; and up to about 15 percent of a fluorine-free copolymerizable monomer, said fluoroaliphatic radical being a fluorinated, saturated, monovalent, non-aromatic, aliphatic radical of at least 3 carbon atoms.

* * * * *